(12) United States Patent
Xu et al.

(10) Patent No.: US 12,401,897 B2
(45) Date of Patent: Aug. 26, 2025

(54) LENS POSITIONING FOR SECONDARY CAMERA IN MULTI-CAMERA SYSTEM

(71) Applicant: QUALCOMM Incorporated, San Diego, CA (US)

(72) Inventors: Jintao Xu, Beijing (CN); Yaoyao Hou, Beijing (CN); Mingchen Gao, Beijing (CN); Xiaocheng Wang, Beijing (CN); Zhigang Tian, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 179 days.

(21) Appl. No.: 18/546,524

(22) PCT Filed: Apr. 28, 2021

(86) PCT No.: PCT/CN2021/090471
§ 371 (c)(1),
(2) Date: Aug. 15, 2023

(87) PCT Pub. No.: WO2022/226823
PCT Pub. Date: Nov. 3, 2022

(65) Prior Publication Data
US 2024/0121511 A1   Apr. 11, 2024

(51) Int. Cl.
*H04N 23/67* (2023.01)
(52) U.S. Cl.
CPC ......... *H04N 23/675* (2023.01); *H04N 23/671* (2023.01); *H04N 23/672* (2023.01)
(58) Field of Classification Search
CPC .. H04N 23/675; H04N 23/671; H04N 23/672; H04N 23/958; H04N 23/45; G03B 19/22; G03B 13/36; G02B 7/28
See application file for complete search history.

(56) References Cited

U.S. PATENT DOCUMENTS

| | | | |
|---|---|---|---|
| 2011/0018972 A1 | 1/2011 | Pan | |
| 2015/0092066 A1* | 4/2015 | Geiss | H04N 13/296 348/180 |

(Continued)

FOREIGN PATENT DOCUMENTS

| | | | |
|---|---|---|---|
| CN | 111345025 A | 6/2020 | |
| CN | 112129263 A | 12/2020 | |

(Continued)

OTHER PUBLICATIONS

Supplementary European Search Report—EP21938309—Search Authority—Munich—Nov. 27, 2024 (11 pp).

(Continued)

*Primary Examiner* — Shahbaz Nazrul
(74) *Attorney, Agent, or Firm* — Shumaker & Sieffert, P.A./QUALCOMM Incorporated

(57) ABSTRACT

An example method for camera processing includes detecting a first region of interest for image content captured with a primary camera, detecting a second region of interest for image content captured with a secondary camera, comparing the first region of interest and the second region of interest, determining a first lens position for a secondary camera lens of the secondary camera based on an autofocus process for the secondary camera, determining a second lens position for the secondary camera lens of the secondary camera based on a determined lens position for a primary camera lens of the primary camera, determining a lens position for the secondary camera lens based on the first lens position or the second lens position based at least in part on the comparison, and causing the secondary camera to capture images with the secondary camera lens at the determined lens position.

30 Claims, 5 Drawing Sheets

(56) References Cited

U.S. PATENT DOCUMENTS

| | | | |
|---|---|---|---|
| 2016/0147131 A1* | 5/2016 | Richards | H04N 23/45 |
| | | | 348/187 |
| 2016/0295097 A1 | 10/2016 | Shanmugavadivelu et al. | |
| 2017/0011525 A1* | 1/2017 | Kim | G06V 20/52 |
| 2017/0118393 A1* | 4/2017 | Dayana | H04N 13/239 |
| 2018/0152618 A1* | 5/2018 | Wei | H04N 23/672 |
| 2019/0208132 A1* | 7/2019 | Saito | H04N 23/672 |
| 2019/0215438 A1 | 7/2019 | Lee et al. | |
| 2019/0253607 A1* | 8/2019 | Chen | H04N 23/62 |
| 2019/0335065 A1* | 10/2019 | Kim | H04N 23/67 |
| 2020/0120260 A1 | 4/2020 | Li | |
| 2020/0265603 A1* | 8/2020 | Yim | H04N 23/90 |
| 2021/0051262 A1 | 2/2021 | Wang | |
| 2021/0352215 A1 | 11/2021 | Kim et al. | |
| 2022/0182546 A1* | 6/2022 | Hua | G06T 5/73 |

FOREIGN PATENT DOCUMENTS

| | | |
|---|---|---|
| WO | 2016160335 | 10/2016 |
| WO | 2017030664 A1 | 2/2017 |
| WO | 2020060235 A1 | 3/2020 |

OTHER PUBLICATIONS

International Search Report and Written Opinion—PCT/CN2021/090471—ISA/EPO—Jan. 14, 2022 (9 pp).

* cited by examiner

LENS POSITIONING FOR SECONDARY CAMERA IN MULTI-CAMERA SYSTEM

This application is a national stage application under 35 U.S.C. § 371 of PCT Application No. PCT/CN2021/090471, filed Apr. 28, 2021. The entire content of PCT Application No. PCT/CN2021/090471 is incorporated herein by reference as if fully set forth below in its entirety and for all applicable purposes.

TECHNICAL FIELD

The disclosure relates to image capture and processing.

BACKGROUND

Image capture devices are incorporated into a wide variety of devices. In this disclosure, an image capture device refers to any device that can capture one or more digital images, including devices that can capture still images and devices that can capture sequences of images to record video. By way of example, image capture devices may comprise stand-alone digital cameras or digital video camcorders, camera-equipped wireless communication device handsets, such as mobile telephones having one or more cameras, cellular or satellite radio telephones, camera-equipped personal digital assistants (PDAs), panels or tablets, gaming devices, computer devices that include cameras, such as so-called "web-cams," or any devices with digital imaging or video capabilities.

Image capture devices may include multiple cameras (e.g., multiple image sensors and/or multiple lenses) that may be used to support various imaging techniques. An image capture device may capture images with two or more cameras of the multiple cameras and process the images to produce specific image effects, such as depth-of-field effects (e.g., a "bokeh" or "portrait mode" effect).

SUMMARY

In general, this disclosure describes example techniques to determine a position of a lens of a secondary camera for capturing images for image effects such as depth-of-field effects. As described in more detail, a camera processor may determine a lens position for a primary camera and a lens position for a secondary camera based on respective autofocus determinations for the primary camera and the secondary camera. The camera processor may also determine a lens position for the secondary camera based on the determined lens position for the primary camera.

In one or more examples, the camera processor may determine whether the lens position for the secondary camera should be set based on the lens position of the first camera or based on autofocus determination for the secondary camera based on whether one or more criteria are satisfied. Examples of the criteria include whether one or more processors identified a same region of interest (ROI) in images captured with the primary camera and the secondary camera, whether the confidence of the autofocus for the secondary camera is greater than a threshold, and possibly others. In this manner, rather than relying only on the lens position of the primary camera to determine the lens position of the secondary camera, the example techniques described in this disclosure provide for an adaptive manner in which to determine the lens position of the secondary camera, which may result in captured image content that provides better image effects, like depth-of-field effects.

For instance, the example techniques may be considered as a hybrid auto focus technique for the secondary camera auto focus in a multi-camera use case. The image content captured by both primary camera and the secondary camera may have quality sharpness which results in better imaging effects, like for image fusion purpose (e.g., depth-of-field effects) to get more sharpness in the final image content.

In one example, this disclosure describes a device configured for camera processing includes a memory configured to receive images; and one or more processors in communication with the memory, the one or more processors configured to: detect a first region of interest for image content captured with a primary camera; detect a second region of interest for image content captured with a secondary camera; compare the first region of interest and the second region of interest; determine a first lens position for a secondary camera lens of the secondary camera based on an autofocus process for the secondary camera; determine a second lens position for the secondary camera lens of the secondary camera based on a determined lens position for a primary camera lens of the primary camera; determine a lens position for the secondary camera lens based on the first lens position or the second lens position based at least in part on the comparison of the first region of interest and the second region of interest; and cause the secondary camera to capture images with the secondary camera lens at the determined lens position.

In another example, this disclosure describes a method for camera processing includes detecting a first region of interest for image content captured with a primary camera; detecting a second region of interest for image content captured with a secondary camera; comparing the first region of interest and the second region of interest; determining a first lens position for a secondary camera lens of the secondary camera based on an autofocus process for the secondary camera; determining a second lens position for the secondary camera lens of the secondary camera based on a determined lens position for a primary camera lens of the primary camera; determining a lens position for the secondary camera lens based on the first lens position or the second lens position based at least in part on the comparison of the first region of interest and the second region of interest; and causing the secondary camera to capture images with the secondary camera lens at the determined lens position.

In another example, this disclosure describes a computer-readable storage medium storing instructions thereon that when executed cause one or more processors to: detect a first region of interest for image content captured with a primary camera; detect a second region of interest for image content captured with a secondary camera; compare the first region of interest and the second region of interest; determine a first lens position for a secondary camera lens of the secondary camera based on an autofocus process for the secondary camera; determine a second lens position for the secondary camera lens of the secondary camera based on a determined lens position for a primary camera lens of the primary camera; determine a lens position for the secondary camera lens based on the first lens position or the second lens position based at least in part on the comparison of the first region of interest and the second region of interest; and cause the secondary camera to capture images with the secondary camera lens at the determined lens position.

In another example, this disclosure describes a device for camera processing includes means for detecting a first region of interest for image content captured with a primary camera; means for detecting a second region of interest for image content captured with a secondary camera; means for comparing the first region of interest and the second region of interest; means for determining a first lens position for a secondary camera lens of the secondary camera based on an autofocus process for the secondary camera; means for determining a second lens position for the secondary camera lens of the secondary camera based on a determined lens position for a primary camera lens of the primary camera; means for determining a lens position for the secondary camera lens based on the first lens position or the second lens position based at least in part on the comparison of the first region of interest and the second region of interest; and means for causing the secondary camera to capture images with the secondary camera lens at the determined lens position.

This summary is intended to provide an overview of the subject matter described in this disclosure. It is not intended to provide an exclusive or exhaustive explanation of the systems, device, and methods described in detail within the accompanying drawings and description herein. Further details of one or more examples of the disclosed technology are set forth in the accompanying drawings and in the description below. Other features, objects, and advantages of the disclosed technology will be apparent from the description, drawings, and claims.

BRIEF DESCRIPTION OF DRAWINGS

Like reference characters denote like elements throughout the description and figures.

DETAILED DESCRIPTION

Figure 1:
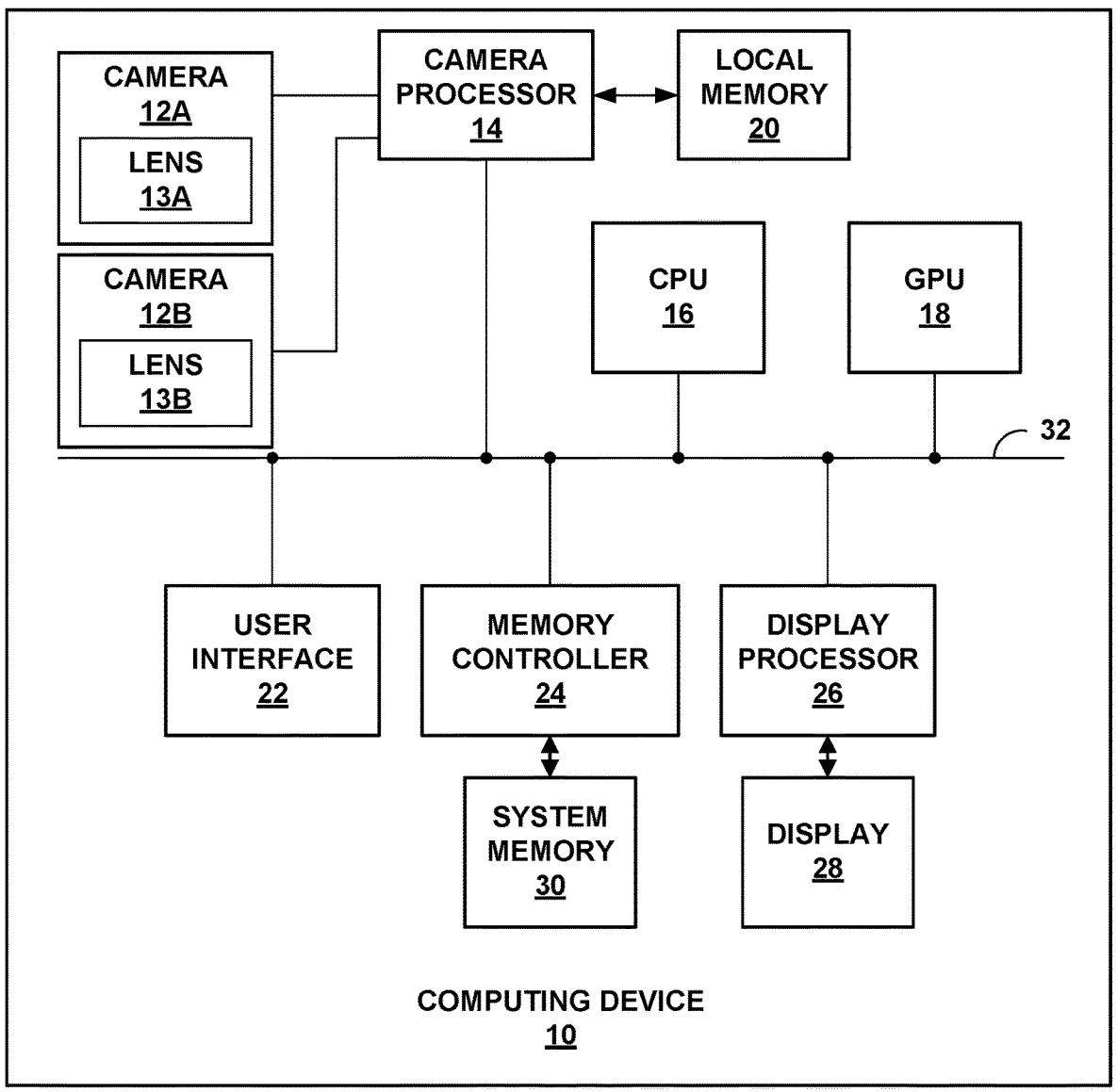
FIG. 1 is a block diagram of a device configured to perform one or more of the example techniques described in this disclosure.

For image capture, a primary camera (sometimes referred to as a master camera) and a secondary camera (sometimes referred to as a follower or slave camera) work in conjunction for image processing. As one example, for a depth-of-field (e.g., bokeh) effect, the primary camera and secondary camera both capture images, and a camera processor processes the captured images to generate a depth map and produce an image that exhibits a particular depth-of-field. A depth-of-field is the distance between the nearest and farthest object that are in sharp focus. For bokeh effects, the depth-of-field may be fairly shallow.

Bokeh is defined as the effect of a soft out-of-focus background that is achieved when photographing a subject in the foreground (e.g., a subject of portraiture). A bokeh effect can be achieved using post-processing and depth maps on devices with smaller form factors (e.g., mobile phones), even if the camera lenses on such devices do not inherently produce a bokeh effect. For example, a mobile device may include multiple cameras and may capture images with two different cameras (e.g., primary and secondary camera) at the same time or near in time. Because these two cameras are separated by a physical distance, the depth (e.g., distance from the camera sensor) of features in a first image of the two images can be calculated based on a comparison of the features in the first image to the features in the second image. A bokeh effect process may then use the calculated depth map to blur pixels in the image. For example, pixels and/or features at a depth that matches the focus distance of the image are kept in focus, while pixels that are farther away from the focus distance are blurred. In one example, pixels and/or features that are not at the same depth as the focus distance are all blurred at the same rate. In another example, the farther away a pixel and/or feature is from the focal distance, the more blur that may be applied by the bokeh effect.

For image capture, where a particular depth-of-field may be achieved, such as for bokeh effect, a primary camera is used for image preview and performs autofocus, and a secondary camera is used for depth estimation. The example techniques are described for depth-of-field effects, but may be applicable to other techniques, such as techniques for image fusion (e.g., image content from two or more cameras is fused).

In some examples, the images from both the primary camera and the secondary camera are used to determine the depth estimation. In some techniques, one or more processors determine the lens position for the primary camera lens as part of the autofocus for the primary camera, and the one or more processors determine the lens position for the secondary camera lens based on the position of the primary camera lens. In some cases, determining the lens position for the secondary camera lens based on the lens position for the primary camera can result in incorrect positioning of the secondary camera lens. The incorrect positioning of the secondary camera lens may result in an inaccurate depth map, which may cause depth-of-field effects like bokeh to be of lower quality.

This disclosure describes example techniques in which the one or more processors utilize autofocus to determine the secondary camera lens position. The one or more processors may then set the position of the secondary camera lens to the lens position determined by the autofocus of the secondary camera or to the lens position determined based on the lens position of the primary camera. For example, the secondary camera lens position determined based on the autofocus of the secondary camera may be a first lens position, and the secondary camera lens position determined based on the lens position of the primary camera lens may be a second lens position. The one or more processors may determine whether the secondary lens position should be set to the first lens position or the second lens position based on whether one or more certain criteria are satisfied.

Accordingly, the example techniques may be considered as a hybrid autofocus technique for the secondary camera where the lens position for the secondary camera can be selectively set based on the lens position of the primary camera or based on the lens position determined for the secondary camera. The example techniques may result in sharp image content captured by the primary camera and the secondary camera, which may result in better image effects. For instance, image effects that utilize image fusion (e.g., image content from both the primary and secondary camera) such as Bokeh effect may result in higher quality image content.

As one example, the one or more processors may determine whether the autofocus for both the primary and secondary camera is based on identification of the same regions of interest (e.g., faces from face detection algorithm). If the one or more processors identified different regions of interest in the images captured with the primary and secondary cameras, then the one or more processors may select the second lens position for the secondary camera (e.g., secondary camera lens position determined based on the lens position of the primary camera lens). If the one or more processors identified the same regions of interest, then the one or more processors may determine whether a confidence associated with one or more depth estimation algorithms (e.g., phase detection autofocus (PDAF) or time of flight (TOF) algorithms) determining the depth estimation is greater than a threshold. If the confidence is greater than the threshold, then the one or more processors may select the first lens position for the secondary camera (e.g., secondary camera lens position determined based on the autofocus of the secondary camera). If the confidence is less than the threshold, then the one or more processors may select the second lens position for the secondary camera (e.g., secondary camera lens position determined based on the lens position of the primary camera lens).

The one or more processors may set the lens position for the primary and secondary cameras based on the respective determined lens positions. The one or more processors may process the captured images, such as to create the bokeh effect, and generate a final image for display.

FIG. 1 is a block diagram of a computing device 10 configured to perform one or more of the example techniques described in this disclosure for lens position for a secondary camera in a multi-camera system. Examples of computing device 10 include a computer (e.g., personal computer, a desktop computer, or a laptop computer), a mobile device such as a tablet computer, a wireless communication device (such as, e.g., a mobile telephone, a cellular telephone, a satellite telephone, and/or a mobile telephone handset), an Internet telephone, a digital camera, a digital video recorder, a handheld device, such as a portable video game device or a personal digital assistant (PDA), a drone device, or any device that may include one or more cameras.

In some examples, computing device 10 may include camera 12A having lens 13A and camera 12B having lens 13B, camera processor 14, a central processing unit (CPU) 16, a graphics processing unit (GPU) 18, local memory 20 of camera processor 14, user interface 22, memory controller 24 that provides access to system memory 30, and display processor 26 that outputs signals that cause graphical data to be displayed on display 28. FIG. 1 illustrates two cameras, camera 12A and camera 12B (collectively cameras 12), but there may be additional cameras 12.

In some examples, cameras 12 need not necessarily be formed on computing device 10, and may be separate cameras that are coupled to computing device 10 (e.g., via a wired connection). Moreover, although one camera processor 14 is illustrated, in some examples, there may be a plurality of camera processors, like camera processor 14 (e.g., a first camera processor coupled to camera 12A and a second camera processor coupled to camera 12B).

Also, there may be more or fewer components on computing device 10 then illustrated. For instance, computing device 10 may include video encoder/decoder for encoding or decoding video, speaker and microphone for communication, antenna and modem for wireless communication, and the like.

Cameras 12 may each include respective arrays of pixel sensors (e.g., pixels) for capturing representations of light, processing circuitry, memory, such as buffer memory or on-chip sensor memory, etc. Lens 13A and 13B (collectively lenses 13) of camera 12A and camera 12B may be different types of lens (e.g., each of lenses 13 and image sensor combination having different apertures and/or fields-of-view). Example lenses may include a telephoto lens, a wide angle lens, an ultra-wide angle lens, or other lens types.

Cameras 12 (e.g., via respective lenses 13 and sensors) are configured to capture at least one frame of image data and transfer the at least one frame of the image data to camera processor(s) 14 and/or CPU 16. In an illustrative example, camera 12A is configured to transfer a first frame of image data to camera processor(s) 14 and camera 12B is configured to transfer a second frame of image data to camera processor(s) 14.

In some examples, camera 12A may be a primary camera and camera 12B may be a secondary camera. For instance, camera 12B may be utilized for depth estimation, such as being a time-of-flight camera used to determine time it takes light outputted by a light emitting diode (LED) of camera 12B to return back to camera 12B for determining depth. As another example, during preview mode (e.g., prior to a user capturing image frames that stored long term), display 28 may display image content that is being captured with camera 12A (e.g., primary camera) and not from camera 12B (e.g., secondary camera).

For frame capture (e.g., for preview mode, snapshot, or video recording), CPU 16 may be configured to perform autofocus to set the position of lenses 13. In some examples, CPU 16 may execute "3A" algorithms. Such algorithms may include autofocus (AF), auto exposure control (AEC), and auto white balance (AWB) techniques. In such examples, 3A may represent the functionality of a statistics algorithm processing engine, where CPU 16 may implement and operate such a processing engine. Although the example is described with respect to CPU 16 performing the "3A" algorithms, including performing an autofocus process, the example techniques are not so limited. Camera processor 14 or other processing circuitry, including processing circuitry of cameras 12 may be configured to execute "3A" algorithms.

In general, the example techniques described in this disclosure may be performed with processing circuitry. Examples of the processing circuitry including processing circuitry of cameras 12, camera processor 14, CPU 16, GPU 18, display processor 26, or any combination thereof. For ease of explanation, the example techniques are described with respect to CPU 16, but the example techniques should not be considered limited to being performed with CPU 16.

For autofocus, lens 13A and lens 13B may be configured to move along an axis to change a distance between lens 13A and lens 13B and their respective array of sensors. Lens 13A and lens 13B positioned at one end of the axis may result in focus on nearby objects, and lens 13A and lens 13B positioned at other end of the axis may result in focus on distant objects.

As described in more detail, this disclosure describes example techniques to determine the lens positions of lens 13A and lens 13B of the primary camera 12A and the secondary camera 12B that may result in high quality images for display (e.g., correct positioning of lenses 13A and 13B for generating an accurate depth map, which may cause depth-of-field effects like bokeh to be of higher quality). For example, CPU 16 may be configured to determine a first lens position for secondary camera lens 13B for the secondary camera 12B based on an autofocus process for the secondary camera 12B. In addition, CPU 16 may be configured to determine a second lens position for the secondary camera lens 13B of the secondary camera 12B based on a determined lens position for a primary camera lens 13A of the primary camera 12A (e.g., using a mapping function). As described in more detail, CPU 16 may determine a lens position for the secondary camera lens 13B based on the first lens position or the second lens position based at least in part of certain criteria being satisfied.

In some techniques, CPU 16 may perform an autofocus process on the primary camera (e.g., camera 12A) to determine a lens position for lens 13A. Then, rather than performing an autofocus process on the secondary camera (e.g., camera 12B), CPU 16 may determine the lens position for lens 13B based on the lens position for lens 13A. As one example, CPU 16 may apply a mapping function (F(x)), where x is the input parameter and the position of lens 13A and the output of the mapping function is the position of lens 13B.

In some cases, CPU 16 determining the lens position for lens 13B based on the lens position for lens 13A may result in imprecise positioning of lens 13B. One possible reason for the imprecise positioning of lens 13B may be because the mapping function (e.g., F(x)) for mapping lens position of lens 13B based on lens position of lens 13A may not account for differences in manufacturing. For example, the precision of the mapping function may depend on several factors, such as module calibrated anchor data error rate for camera 12B, degree of temperature rise/burn in for camera 12B, camera 12B variance and assembly, and the like.

In accordance with one or more examples described in this disclosure, CPU 16 may be configured to select between a first lens position or a second lens position for secondary camera lens 13B for secondary camera 12B. The first lens position may be based on an autofocus process for secondary camera 12B, and the second lens position may be based on a determined lens position for primary camera lens 13A for the primary camera 12A. In this way, in cases where the first lens position is a better lens position (e.g., in terms of producing more accurate depth information for generating quality images with bokeh effect), CPU 16 may be able to set the lens position for lens 13B to the first position. However, in cases where the second lens position is a better lens position (e.g., in terms of producing more accurate depth information for generating quality images with bokeh effect), CPU 16 may be able to set the lens position for lens 13B to the second position.

In some examples, camera processor 14 is configured to receive image frames (e.g., pixel data) from cameras 12, and process the image frames to generate image and/or video content. For example, cameras 12 may be configured to capture individual frames, frame bursts, frame sequences for generating video content, photo stills captured while recording video, preview frames, or motion photos from before and/or after capture of a still photograph. CPU 16, GPU 18, camera processor(s) 14, or some other circuitry may be configured to process the image and/or video content captured with cameras 12 into images or video for display on display 28. Image frames may generally refer to frames of data for a still image or frames of video data or combinations thereof, such as with motion photos. Camera processor 14 may receive from cameras 12 pixel data of the image frames in any format. For example, the pixel data may include different color formats, such as RGB, YCbCr, YUV, etc. In any case, camera processor 14 may receive, from cameras 12, a plurality of frames of image data.

In examples including multiple camera processor(s) 14, camera processor(s) 14 may share cameras 12, where each of camera processor(s) 14 may interface with each of camera(s) 12. In any event, camera processor(s) 14 may initiate capture of a video or image of a scene using a plurality of pixel sensors of camera(s) 12. In some examples, a video may include a sequence of individual frames. As such, camera processor(s) 14 causes camera(s) 12 to capture the image using the plurality of pixel sensors.

Camera(s) 12 may then output pixel information to camera processor(s) 14 (e.g., pixel values, luma values, color values, charge values, Analog-to-Digital Units (ADU) values, etc.), the pixel information representing the captured image or sequence of captured images. In some examples, camera processor(s) 14 may process monochrome and/or color images to obtain an enhanced color image of a scene. In some examples, camera processor(s) 14 may determine universal blending weight coefficient(s) for different types of pixel blending or may determine different blending weight coefficient(s) for blending different types of pixels that make up a frame of pixels (e.g., a first blending weight coefficient for blending pixels obtained via a monochrome sensor of camera 12A and pixels obtained via a monochrome sensor of camera 12B, a second blending weight coefficient for blending pixels obtained via a Bayer sensor of first camera 12A and pixels obtained via a Bayer sensor of second camera 12B, etc.).

As described above, CPU 16 may be configured to determine a lens position for the secondary camera lens 13B based on the first lens position or the second lens position based at least in part on satisfying certain criteria. One example of the criteria to be satisfied is based on a comparison of a region of interest detected in image content captured with primary camera 12A and a region of interest detected in image content captured with secondary camera 12B.

As one example, CPU 16 may be configured to detect a first region of interest (ROI) in the image content captured with primary camera 12A and detect a second ROI in the image content captured with secondary camera 12B. The ROI may be an object (e.g., face through face detection, pet through pet detection, an object in the foreground, etc.) CPU 16 may be configured to compare the first ROI and the second ROI to determine whether the object in the first ROI is the same as the object in the second ROI (e.g., the same face was detected, the same number of faces were detected, and if multiple faces are detected, the dominant face is the same, etc.). CPU 16 may be configured to determine a lens position for the secondary camera lens 13B based on the first lens position or the second lens position based at least in part on the comparison of the first region of interest and the second region of interest (e.g., based in part on the object in the first ROI being the same as the object in the second ROI).

As another example, the first ROI and the second ROI may be indicative of a location in respective frames captured with the primary camera 12A and the secondary camera 12B. For example, the first ROI and the second ROI may be a rectangular region defined by respective coordinates. CPU 16 may be configured to compare a location of the first ROI and a location of the second ROI (e.g., compare lengths and widths of the ROIs, coordinates of the ROIs, etc.). CPU 16 may be configured to determine a lens position for the secondary camera lens 13B based on the first lens position or the second lens position based at least in part on the comparison of the first region of interest and the second region of interest (e.g., based in part on the location of the first ROI being the same as the location of the second ROI).

In above examples, CPU 16 may determine a lens position for the secondary camera lens 13B based on the first lens position or the second lens position based at least in part on the comparison of the first region of interest and the second region of interest. For instance, if the first region of interest and the second region of interest are the same (e.g., same object in the first ROI and the second ROI or same location of the first ROI and the second ROI), then CPU 16 may determine a lens position of the secondary camera lens 13B based on the first lens position (e.g., the lens position of secondary camera lens 13B is the lens position based on an autofocus process for secondary camera 12B). However, if the first region of interest and the second region of interest are different (e.g., different object in the first ROI and the second ROI or different location of the first ROI and the second ROI), then CPU 16 may determine a lens position of the secondary camera lens 13B based on the second lens position (e.g., the lens position of secondary camera lens 13B is based on a lens position of primary camera lens 13A for primary camera 12A).

In some examples, even if the first region of interest and the second region of interest are the same, CPU 16 may utilize additional criteria to determine whether a lens position for the secondary camera lens 13B should be based on the first lens position or the second lens position. As one example, as part of the autofocus, CPU 16 may utilize one or more depth estimation algorithms to determine where to focus. One example of a depth detection algorithm is a phase detection autofocus (PDAF) algorithm. Another example of a depth detection algorithm is a time of flight (TOF) algorithm. The PDAF algorithm and TOF algorithm are described in more detail below.

In one or more examples, the depth detection algorithm may also generate a confidence value indicative of confidence that the autofocus determination is correct. For instance, the depth detection algorithm may indicate how confident the depth detection algorithm is in the determination of where to focus. In some examples, if the confidence value is below a threshold, then CPU 16 may determine that the lens position of the secondary camera lens 13B should be based on the second lens position (e.g., based on the lens position of the primary camera lens 13A) even if the first region of interest and the second region of interest are the same.

After CPU 16 determines the lens position for the secondary camera lens 13B and the lens position for the primary camera lens 13A (e.g., based on autofocus process for camera 12A), CPU 16 may cause the secondary camera 12B to capture images with the secondary camera lens 13B at the determined lens position, and cause the primary camera 12A to capture images with the primary camera lens 13A at the determined lens position. In some examples, CPU 16 and/or camera processor 14 may generate a final image based on images captured by the primary camera 12A and the secondary camera 12B. As one example, CPU 16 and/or camera processor 14 may generate a final image having a bokeh effect based on a first image captured with the primary camera 12A and a second image captured with the secondary camera 12B.

A bokeh effect may be defined as the effect of a soft out-of-focus background that is achieved when photographing a subject in the foreground (e.g., a portrait). In digital single lens reflex (DSLR) cameras, different bokeh effects may be achieved by using different lenses with different fields-of-view and lens geometries. Bokeh effects are often aesthetically pleasing for portraits when using a telephoto lens at approximately 2× zoom.

A bokeh effect can also be achieved by camera processor 14 by applying post-processing that use depth maps. For example, camera processor 14 may instruct cameras 12 to generate two images at the same time. Because the sensors of cameras 12 are separated by a physical distance, the depth of features of a first image from a primary camera 12A of the two images can be calculated based on a comparison to those features in a second image generated by a secondary camera 12B. Camera processor 14 may then apply a bokeh effect on the image produced from camera 12A by using the calculated depth map to blur features in the image. For example, camera processor 14 may keep in focus features at a depth that matches the focus distance of the generated image, while camera processor 14 may blur features that are farther away from the focus distance. In some examples, the farther away a pixel is from the focal distance, the more blur that camera processor 14 may apply with the bokeh effect.

Although the various structures of computing device 10 are illustrated as separate in FIG. 1, the techniques of this disclosure are not so limited, and in some examples the structures may be combined to form a system on chip (SoC). As an example, camera processor 14, CPU 16, GPU 18, and display processor 26 may be formed on a common integrated circuit (IC) chip. In some examples, one or more of camera processor 14, CPU 16, GPU 18, and display processor 26 may be formed on separate IC chips. Various other permutations and combinations are possible, and the techniques of this disclosure should not be considered limited to the example illustrated in FIG. 1. In an example, CPU 16 may include camera processor 14 such that one or more of camera processor(s) 14 are part of CPU 16. In such examples, CPU 16 may be configured to perform one or more of the various techniques otherwise ascribed herein to camera processor 14.

The various structures illustrated in FIG. 1 may be configured to communicate with each other using bus 32. Bus 32 may be any of a variety of bus structures, such as a third-generation bus (e.g., a HyperTransport bus or an InfiniBand bus), a second-generation bus (e.g., an Advanced Graphics Port bus, a Peripheral Component Interconnect (PCI) Express bus, or an Advanced eXtensible Interface (AXI) bus) or another type of bus or device interconnect. It should be noted that the specific configuration of buses and communication interfaces between the different structures shown in FIG. 1 is merely exemplary, and other configurations of computing devices and/or other image processing systems with the same or different structures may be used to implement the techniques of this disclosure.

In addition, the various components illustrated in FIG. 1 (whether formed on one device or different devices), including cameras 12 and camera processor 14, may be formed as at least one of fixed-function or programmable circuitry, or a combination of both, such as in one or more microprocessors, application specific integrated circuits (ASICs), field programmable gate arrays (FPGAs), digital signal processors (DSPs), or other equivalent integrated or discrete logic circuitry. In addition, examples of local memory 20 include one or more volatile or non-volatile memories or storage devices, such as random-access memory (RAM), static RAM (SRAM), dynamic RAM (DRAM), erasable programmable ROM (EPROM), electrically erasable programmable ROM (EEPROM), flash memory, a magnetic data media or an optical storage media.

For example, local memory 20 may provide temporary storage of values produced or utilized by camera processor 14. In some examples, local memory 20 may also provide memory for other components of computing device 10 such as CPU 16, GPU 18, and display processor 26.

In some examples, memory controller 24 may facilitate the transfer of data going into and out of system memory 30. For example, memory controller 24 may receive memory read and write commands, and service such commands with respect to memory 30 in order to provide memory services for various components of computing device 10. In such examples, memory controller 24 may be communicatively coupled to system memory 30. Although memory controller 24 is illustrated in the example of computing device 10 of FIG. 1 as being a processing circuit that is separate from both CPU 16 and system memory 30, in some examples, some or all of the functionality of memory controller 24 may be implemented on one or more of CPU 16, system memory 30, camera processor 14, and/or GPU 18.

System memory 30 may store program modules and/or instructions and/or data that are accessible by camera processor 14, CPU 16, and/or GPU 18. For example, system memory 30 may store user applications (e.g., instructions for a camera application), resulting images from camera processor 14, etc. System memory 30 may additionally store information for use by and/or generated by other components of computing device 10. For example, system memory 30 may act as a device memory for camera processor 14. System memory 30 may include one or more volatile or non-volatile memories or storage devices, such as, for example, RAM, SRAM, DRAM, ROM, EPROM, EEPROM, flash memory, a magnetic data media or an optical storage media. In addition, system memory 30 may store image data (e.g., frames of video data, encoded video data, sensor-mode settings, zoom settings, 3A parameters, etc.).

In some examples, system memory 30 or local memory 20 may store the image data to on-chip memory, such as in a memory buffer of system memory 30 or local memory 20. In another example, system memory 30 or local memory 20 may output image data in order to be stored external from the memory of a chip or buffer, such as to a secure digital (SD™) card of a camera device or in some instances, to another internal storage of a camera device. In an illustrative example, system memory 30 or local memory 20 may be embodied as buffer memory on a camera processor 14 chip, GPU 18 chip, or both where a single chip includes both processing circuitries.

In some examples, system memory 30 may include instructions that cause camera processor 14, CPU 16, GPU 18, and/or display processor 26 to perform the functions ascribed to these components in this disclosure. Accordingly, system memory 30 may be a computer-readable storage medium storing instructions stored thereon that, when executed, cause one or more processors (e.g., camera processor 14, CPU 16, GPU 18, and display processor 26) to perform the various techniques of this disclosure.

In some examples, system memory 30 is a non-transitory storage medium. The term "non-transitory" indicates that the storage medium is not embodied in a carrier wave or a propagated signal. However, the term "non-transitory" should not be interpreted to mean that system memory 30 is non-movable or that its contents are static. As one example, system memory 30 may be removed from computing device 10, and moved to another device. As another example, memory, substantially similar to system memory 30, may be inserted into computing device 10. In certain examples, a non-transitory storage medium may store data that can, over time, change (e.g., in RAM).

In addition, camera processor 14, CPU 16, and GPU 18 may store image data, user interface data, etc., in respective buffers that are allocated within system memory 30. Display processor 26 may retrieve the data from system memory 30 and configure display 28 to display the image represented by the image data, such as via a user interface 22 screen. In some examples, display processor 26 may include a digital-to-analog converter (DAC) that is configured to convert digital values retrieved from system memory 30 into an analog signal consumable by display 28. In other examples, display processor 26 may pass the digital values directly to display 28 for processing.

CPU 16 may comprise a general-purpose or a special-purpose processor that controls operation of computing device 10. A user may provide input to computing device 10 to cause CPU 16 to execute one or more software applications. The software applications that execute on CPU 16 may include, for example, a camera application, a graphics editing application, a media player application, a video game application, a graphical user interface application or another program. For example, a camera application may allow the user to control various settings of cameras 12. The user may provide input to computing device 10 via one or more input devices (not shown) such as a keyboard, a mouse, a microphone, a touch pad or another input device that is coupled to computing device 10 via user interface 22.

One example software application is a camera application. CPU 16 executes the camera application, and in response, the camera application causes CPU 16 to generate content that display 28 outputs. For instance, display 28 may output information such as light intensity, whether flash is enabled, and other such information. The camera application may also cause CPU 16 to instruct camera processor 14 to process the images output by cameras 12 in a user-defined manner. The user of computing device 10 may interface with display 28 (e.g., via user interface 22) to configure the manner in which the images are generated (e.g., with zoom settings applied, with or without flash, focus settings, exposure settings, video or still images, and other parameters). For example, CPU 16 may receive via user interface 22 an instruction to apply a depth-of-field effect, such as a bokeh effect (e.g., in a so-called "portrait" mode). The portrait mode may further include a bokeh setting that indicates an amount of blurring to apply.

Display 28 may include a monitor, a television, a projection device, an HDR display, a liquid crystal display (LCD), a plasma display panel, a light emitting diode (LED) array, an organic LED (OLED), electronic paper, a surface-conduction electron-emitted display (SED), a laser television display, a nanocrystal display or another type of display unit. Display 28 may be integrated within computing device 10. For instance, display 28 may be a screen of a mobile telephone handset, a tablet computer, or a laptop. Alternatively, display 28 may be a stand-alone device coupled to computing device 10 via a wired or wireless communications link. For instance, display 28 may be a computer monitor or flat panel display connected to a personal computer via a cable or wireless link. Display 28 may provide preview frames that a user may view to see what is being stored or what a picture might look like if camera 12A were to actually take a picture or start recording video.

Figure 2:
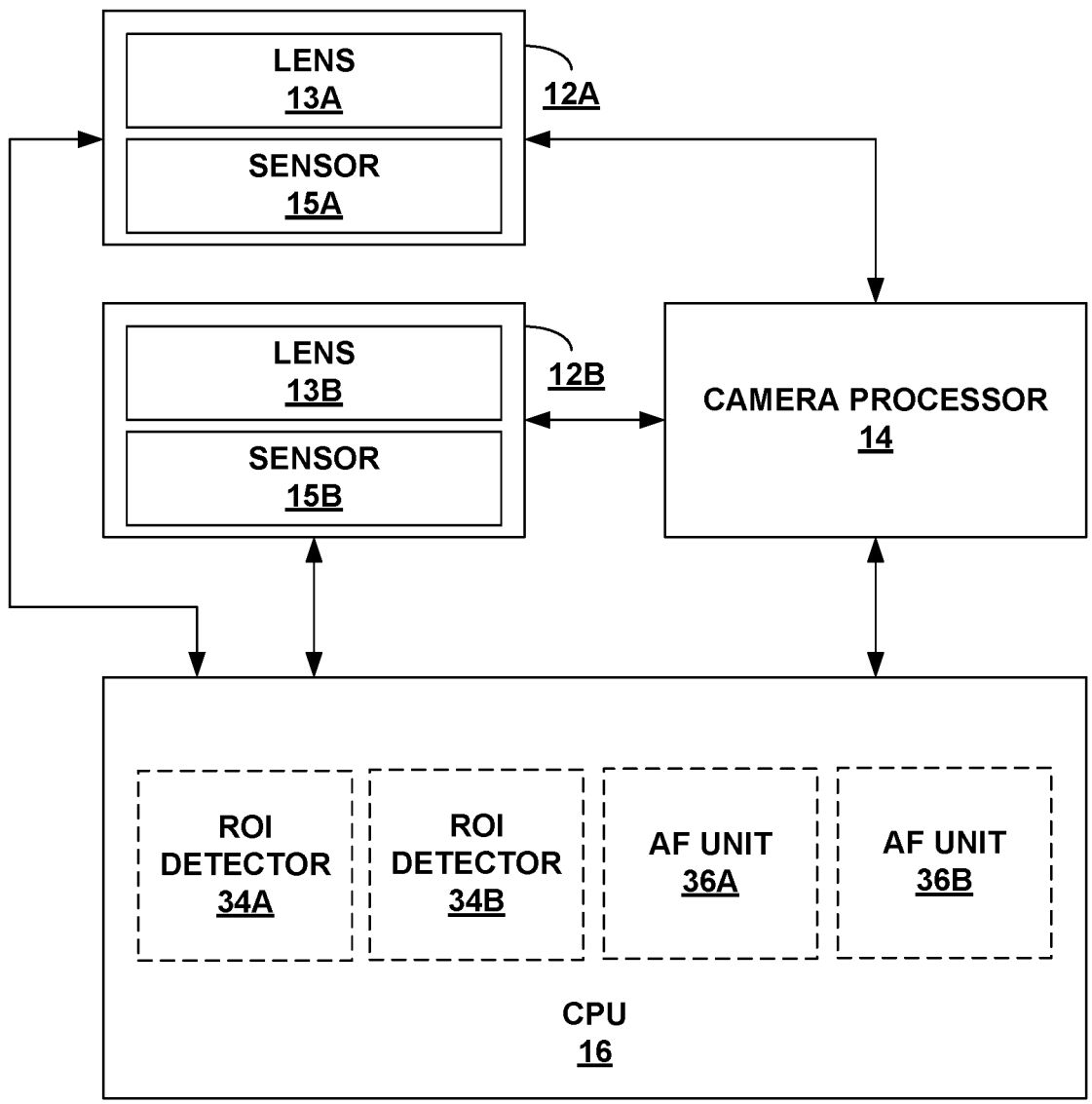
FIG. 2 is a block diagram illustrating example components of the computing device of FIG. 1 in greater detail.

FIG. 2 is a block diagram illustrating example components of the computing device of FIG. 1 in greater detail. In FIG. 2, camera 12A includes sensor 15A, and camera 12B includes sensor 15B. Lens 13A may direct light towards sensor 15A that sensor 15A converts to electrical signals for processing. Similarly, lens 13B may direct light towards sensor 15B that sensor 15B converts to electrical signals for processing.

As illustrated, CPU 16 may be configured to execute ROI detector 34A, ROI detector 34B, AF unit 36A, and AF unit 36B. Although ROI detector 34A, ROI detector 34B, AF unit 36A, and AF unit 36B are illustrated as being executed on programmable circuitry of CPU 16, in one or more examples, ROI detector 34A, ROI detector 34B, AF unit 36A, and AF unit 36B may be formed as fixed-function circuitry within CPU 16 or external to CPU 16. In some examples, ROI detector 34A, ROI detector 34B, AF unit 36A, and AF unit 36B may be formed within camera processor 14.

ROI detector 34A may be configured to detect a first region of interest in images captured with camera 12A (e.g., primary camera), and ROI detector 34B may be configured to detect a second region of interest in images captured with camera 12B (e.g., secondary camera). As one example, ROI detector 34A and ROI detector 34B may be configured to perform face detection in the images captured by camera 12A and camera 12B, respectively. For instance, ROI detector 34A and ROI detector 34B may determine a number of faces and location of faces in the images captured by camera 12A and camera 12B, respectively.

Faces in the captured images is one example of objects in a region of interest, and should not be considered limiting. Other examples of objects that ROI detector 34A and ROI detector 34B may be configured to detect include pets, foreground objects, areas of high contrast, etc. In general, ROI detector 34A and ROI detector 34B may be configured to detect objects for detecting the region of interest. The detected region of interests may be located anywhere within the captured images.

AF unit 36A and AF unit 36B may be configured to determine a lens position for lens 13A and lens 13B, respectively. AF unit 36A and AF unit 36B may utilize one or more autofocus techniques, examples of which include, contrast detection auto-focus, phase detection autofocus (PDAF), and time of flight (TOF) autofocus (e.g., laser autofocus). In some examples, PDAF and TOF, or other types of autofocus techniques, may be considered as examples of a depth estimation algorithm because PDAF and TOF determine where to position lens 13A and lens 13B, which may be based on how far away the object or area is that is in focus.

For PDAF, AF unit 36A and AF unit 36B may utilize phase difference between light captured on different photodiodes of the sensor 15A via lens 13A and photodiodes of sensor 15B via lens 13B, respectively, to control which area should be focused.

AF unit 36A may perform PDAF for camera 12A utilizing the photodiodes of sensor 15A, without utilizing the photodiodes of sensor 15B. For example, each photodiode of sensor 15A may be split in half, and circuitry of camera 12A or camera processor 14, as two examples, may measure a phase difference between the two halves of the signal pixel sensor. The photodiodes may be referred to as a 2PD sensor or a dual photodiode sensor. AF unit 36B may similarly perform PDAF for camera 12B. There may be other examples of PDAF techniques as well.

PDAF may be based on comparison of two or more images generated with different asymmetric apertures. When lens 13A or lens 13B is not in focus, it is possible to detect disparity caused by the different shape of the asymmetric blur. The size and direction of the disparity is correlated with the defocus amount and direction. AF unit 36A and AF unit 36B, may use PDAF implemented at sensor pixel level, using masking layers, dual diodes, or special lens designs. This allows computing device 10 to focus reliably and efficiently in little or no added cost.

In some examples, AF unit 36A and AF unit 36B may generate a range of lens positions that AF unit 36A and AF unit 36B to evaluate to determine the position of lens 13A and 13B using PDAF techniques. For instance, AF unit 36A and AF unit 36B may output an initial lens position, referred to as defocus value, where there is zero phase difference between light captured on different photodiodes of the sensors of lens 13A and lens 13B. AF unit 36A and AF unit 36B may also output a defocus confidence value indicating confidence in the defocus value.

For TOF, a laser or light emitting diode (LED) outputs an artificial light signal that reflects back from objects, and based on the round-trip time of the light, AF unit 36A and AF unit 36B can determine the distance of objects. Based on the distance of objects, AF unit 36A and AF unit 36B may determine where to autofocus (e.g., focus on nearest object). Similar to PDAF, AF unit 36A and AF unit 36B may generate a confidence value indicative of how confident AF unit 36A and AF unit 36B are in having correctly determined the nearest object.

In accordance with one or more examples described in this disclosure, AF unit 36A may determine the lens position for lens 13A using the example autofocus techniques (e.g., PDAF, TOF, ROI detection from ROI detector 34A, and the like). AF unit 36B may, however, determine the lens position for lens 13B based on a depth estimation algorithm or based on the lens position determined for lens 13A based on whether certain criteria are satisfied.

For example, AF unit 36B may determine a first lens position for a secondary camera lens 13B of the secondary camera 12B based on an autofocus process for the secondary camera 12B (e.g., based on PDAF or TOF, or possibly some other technique like contrast detection). AF unit 36B may determine a second lens position for the secondary camera lens 13B of the secondary camera 12B based on a determined lens position for a primary camera lens 13A of the primary camera 12A. As one example, AF unit 36B may utilize a mapping function to determine the second position for the secondary camera lens 13B of the secondary camera 12B based on the position of lens 13A as determined by AF unit 36A. AF unit 36B may be configured to determine a lens position for the secondary camera lens 13B based on the first lens position or the second lens position in response to certain criteria being satisfied.

For example, as described above, ROI detector 34A may detect a first region of interest for image content captured with a primary camera 12A, and ROI detector 34B may detect a second region of interest for image content captured with a secondary camera 12B (e.g., camera 12B is utilized for depth estimation). AF unit 36B may be configured to compare the first region of interest and the second region of interest.

As one example, comparing the first region of interest and the second region of interest may include AF unit 36B comparing an object in the first region of interest and an object in the second region of interest. In such examples, determining the lens position may include AF unit 36B determining the lens position for the secondary camera lens 13B based on the first lens position based at least in part on the object in the first region of interest being the same as the object in the second region of interest. However, if the object in the first region of interest is not the same as the object in the second region of interest, then AF unit 36B may determine the lens position for the secondary camera lens 13B based on the second lens position (e.g., based on the mapping function that maps the determined lens position for the primary camera lens 13A of the primary camera 12A).

As another example, comparing the first region of interest and the second region of interest may include AF unit 36B comparing a location of the first region of interest and a location of the second region of interest. In such examples, determining the lens position may include AF unit 36B determining the lens position for the secondary camera lens 13B based on the first lens position based at least in part on the location of the first region of interest being the same as the location of the second region of interest. However, if the location of the first region of interest is not the same as the location of the second region of interest, then AF unit 36B may determine the lens position for the secondary camera lens 13B based on the second lens position (e.g., based on the mapping function that maps the determined lens position for the primary camera lens 13A of the primary camera 12A).

In the above example, AF unit 36B determined that the lens position for the secondary camera lens 13B should be first lens position based on the object in the first region of interest and the second region of interest being the same or based on the location of the first region of interest and the second region of interest being the same. However, in some examples, even if the object in the first region of interest and the second region of interest is the same or the location of the first region of interest and the second region of interest is the same, AF unit 36B may be configured to determine whether to the lens position for the secondary camera lens 13B should be at the first position or second position based on additional criteria.

As one example, AF unit 36B may determine a confidence value associated with a depth estimation algorithm for the secondary camera 12B. The depth estimation algorithm is one of a phase detection autofocus (PDAF) algorithm or a time of flight (TOF) algorithm. For instance, as described above, there may be a confidence value associated with PDAF or TOF. In such examples, determining the lens position for the secondary camera lens 13B may include determining the lens position for the secondary camera lens 13B based on the first lens position based on the comparison and the confidence value being greater than a threshold value.

That is, if the comparison of the first region of interest and the second region of interest indicates that the objects are the same (e.g., including that the same number of objects are detected) and/or the locations are the same, and the confidence value associated with the depth estimation algorithm is greater than the threshold value, then AF unit 36B may determine the lens position for the secondary camera lens 13B based on the first lens position (e.g., where the first lens position is based on autofocus process for the secondary camera 12B). However, if the comparison of the first region of interest and the second region of interest indicates that the objects are the same (e.g., including that the same number of objects are detected) and/or the locations are the same, but the confidence value associated with the depth estimation algorithm is less than or equal to the threshold value, then AF unit 36B may determine the lens position for the secondary camera lens 13B based on the second lens position (e.g., where the second lens position is based on a determined lens position for primary camera lens 13A of the primary camera 12A).

In some examples, AF unit 36B may utilize both the PDAF and TOF algorithms. For example, AF unit 36B may determine a first confidence value associated with a first depth estimation algorithm (e.g., PDAF) for the secondary camera 12B and a second confidence value associated with a second depth estimation algorithm (e.g., TOF) for the secondary camera 12B. In this example, determining the lens position for the secondary camera lens 13B may include AF unit 36B determining the lens position for the secondary camera lens 13B based on the first lens position based on the comparison, the first confidence value being less than a first threshold value, and the second confidence value being greater than a second threshold value.

That is, if the comparison of the first region of interest and the second region of interest indicates that the objects are the same (e.g., including that the same number of objects are detected) and/or the locations are the same, and the first confidence value associated with the first depth estimation algorithm (e.g., PDAF) is less than the first threshold value, then AF unit 36B may determine whether the second confidence value associated with the second depth estimation algorithm (e.g., TOF) is greater than the second threshold value. If the second confidence value associated with the second depth estimation algorithm is greater than the second threshold value, then AF unit 36B may determine the lens position for the secondary camera lens 13B based on the first lens position (e.g., based on an autofocus process for secondary camera 12B). If the second confidence value associated with the second depth estimation algorithm is less than or equal to the second threshold value, then AF unit 36B may determine the lens position for the secondary camera lens 13B based on the second lens position (e.g., based on a determined lens position for primary camera lens 13A of primary camera 12A).

Figure 3:
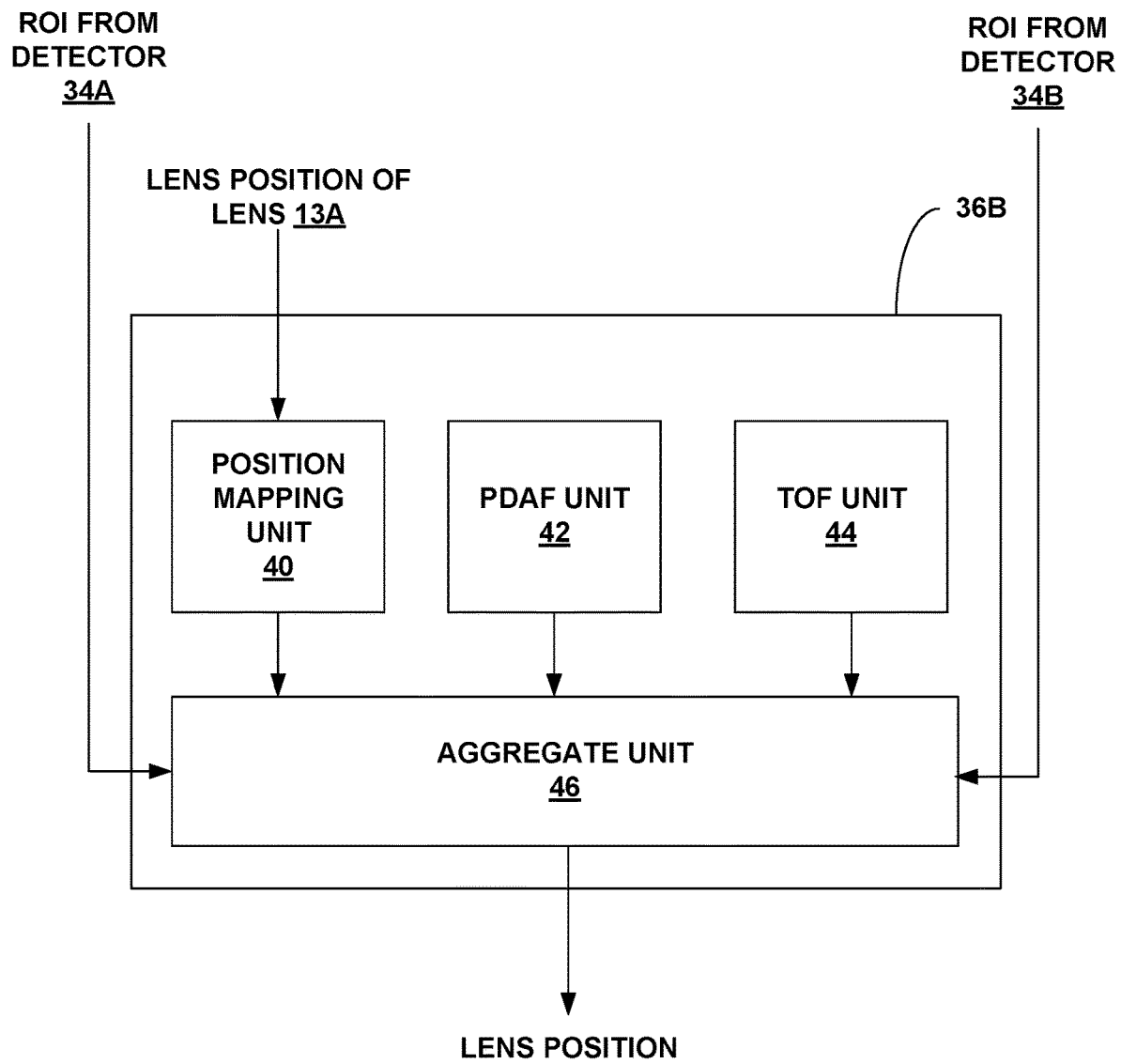
FIG. 3 is a block diagram illustrating example components of an autofocus unit of FIG. 2.

FIG. 3 is a block diagram illustrating example components of an autofocus unit of FIG. 2. For example, FIG. 3 illustrates AF unit 36B in further detail. As illustrated, AF unit 36B includes position mapping unit 40, PDAF unit 42, and TOF unit 44. PDAF unit 42 and/or TOF unit 44 may be configured to determine a first lens position for secondary camera lens 13B of secondary camera 12B based on an autofocus process (e.g., PDAF or TOF, respectively) for secondary camera 12B. In addition, PDAF unit 42 may determine a first confidence value indicative of the confidence of the lens position as determined based on PDAF, and TOF unit 44 may determine a second confidence value indicative of the confidence of objects as determined based on TOF. Position mapping unit 40 may be configured to determine a second lens position for secondary camera lens 13B of secondary camera 12B based on a determined lens position for a primary camera lens 13A of the primary camera 12A (e.g., as determined by AF unit 36A).

Aggregate unit 46 may determine a lens position for the secondary camera lens 13B based on the first lens position or the second lens position. For instance, aggregate unit 46 may receive the first region of interest for image content captured with a primary camera 12A detected by ROI detector 34A, receive the second region of interest for image content captured with a secondary camera 12B, receive the first confidence value associated with PDAF unit 42, and receive a second confidence value associated with TOF unit 44. Aggregate unit 46 may utilize the received information to determine a lens position for the secondary camera lens 13B based on the first lens position or the second lens position.

Figure 4:
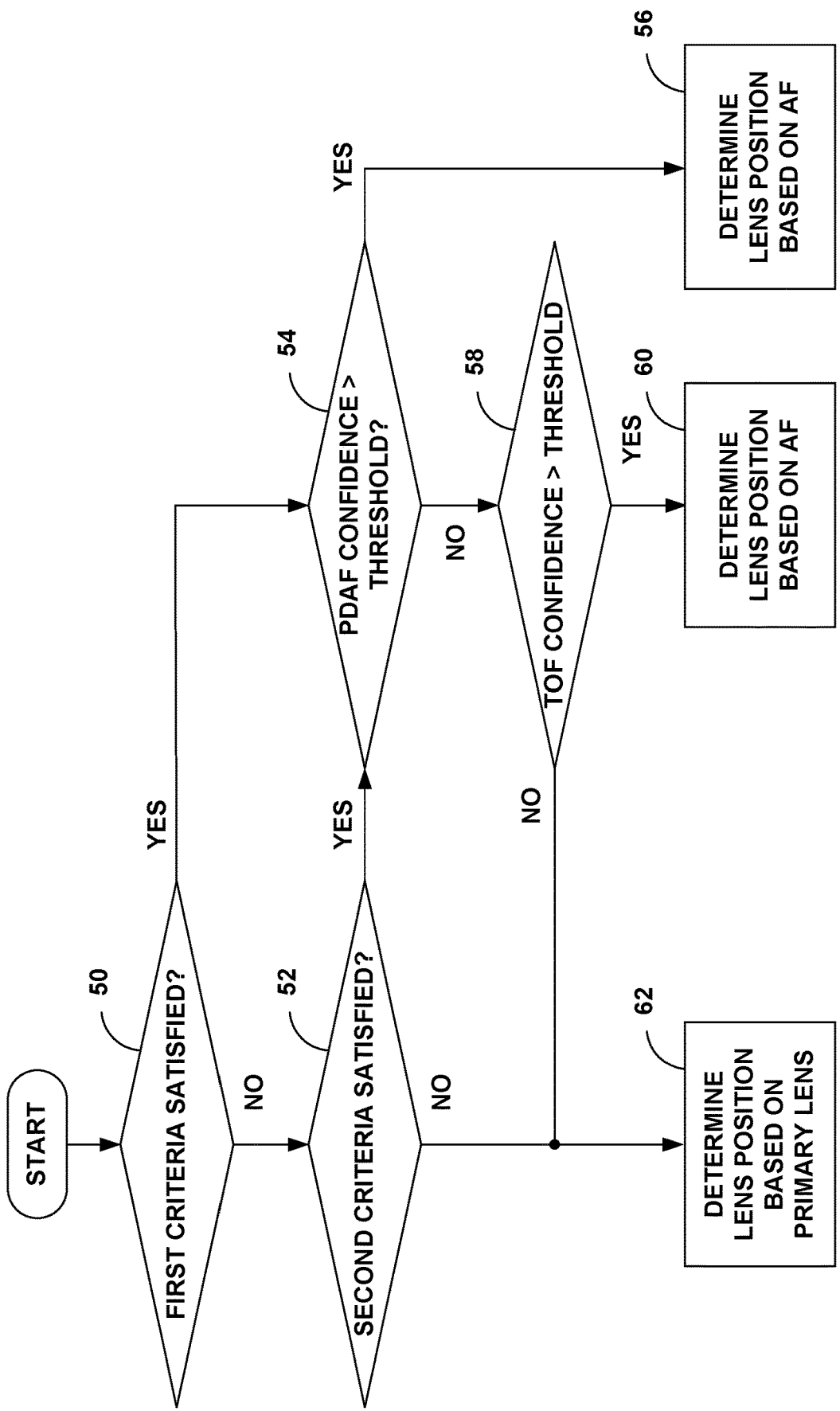
FIG. 4 is a flowchart illustrating an example operation of camera processing in accordance with example techniques of this disclosure.

To ease with understanding, the example of FIG. 3 is described with respect to FIG. 4, which illustrates a method for camera processing. For instance, FIG. 4 is a flowchart illustrating an example operation of camera processing in accordance with example techniques of this disclosure.

Aggregate unit 46 may determine whether a first criteria is satisfied (50). An example of the first criteria may be whether there is only one object to detect (e.g., only one face), and both the first region of interest and the second region of interest are the same object or the same location. For example, aggregate unit 46 may compare the first region of interest and the second region of interest to determine whether an object in the first region of interest and an object in the second region of interest is the same or to determine whether a location of the first region of interest and a location of the second region of interest is the same.

If the first criteria is not satisfied (NO of 50), then aggregate unit 46 may determine whether a second criteria is satisfied (52). An example of the second criteria may be whether there are two or more objects to detect (e.g., two or more faces), and both the first region of interest and the second region of interest are the same dominant object (e.g., dominant face). The second criteria and the first criteria may be the same except that in the second criteria, there are multiple objects. For the first and/or second criteria to be satisfied, the first region of interest and the second region of interest are the same object or the same location.

If the first criteria is satisfied (YES of 50) or the second criteria is satisfied (YES of 52), aggregate unit 46 may determine whether the first confidence value (e.g., confidence value associated with PDAF) is greater than a first threshold value (54). If aggregate unit 46 determines that the first confidence value is greater than the first threshold value (YES of 54), then aggregate unit 46 may determine a lens position for the secondary camera lens 13B based on the first lens position (e.g., based on the PDAF autofocus process for the secondary camera 12B) (56).

If aggregate unit 46 determines that the first confidence value is less than or equal to the first threshold value (NO of 54), then aggregate unit 46 may determine whether the second confidence value (e.g., confidence value associated with TOF) is greater than a second threshold value (58). If aggregate unit 46 determines that the second confidence value is greater than the second threshold value (YES of 58), then aggregate unit 46 may determine a lens position for the secondary camera lens 13B based on the first lens position (e.g., based on the TOF autofocus process for the secondary camera 12B) (60).

If aggregate unit 46 determines that the second criteria is not satisfied (NO of 52) (e.g., aggregate unit 46 determines that an object in the first region of interest is different than an object in the second region of interest) or if the second confidence value is less than second threshold value (NO of 58), the aggregate unit 46 may determine a lens position for the secondary camera lens 13B based on the second lens position (e.g., based on a determined lens position for a primary camera lens 13A of the primary camera 12A) (62). For example, aggregate unit 46 may determine the lens position for secondary camera lens 13B to be the output from position mapping unit 40. Position mapping unit 40 may be configured to apply the mapping function (F(x)) to determine the second lens position based on a determined lens position for a primary camera lens 13A of the primary camera 12A.

In the example of FIG. 4, both the confidence value associated with PDAF and the confidence value associated with TOF are utilized. However, the example techniques are not so limited. For instance, based on the first criteria being satisfied (YES of 50) or the second criteria being satisfied (YES of 52), aggregate unit 46 may determine whether a confidence value (e.g., confidence value associated to PDAF or confidence value associated with TOF) is greater than a threshold value. Based on the confidence value being greater than the threshold value, aggregate unit 46 may determine the lens position for secondary camera lens 13B based on the first lens position (e.g., lens position determined by either PDAF unit 42 or TOF unit 44).

Figure 5:
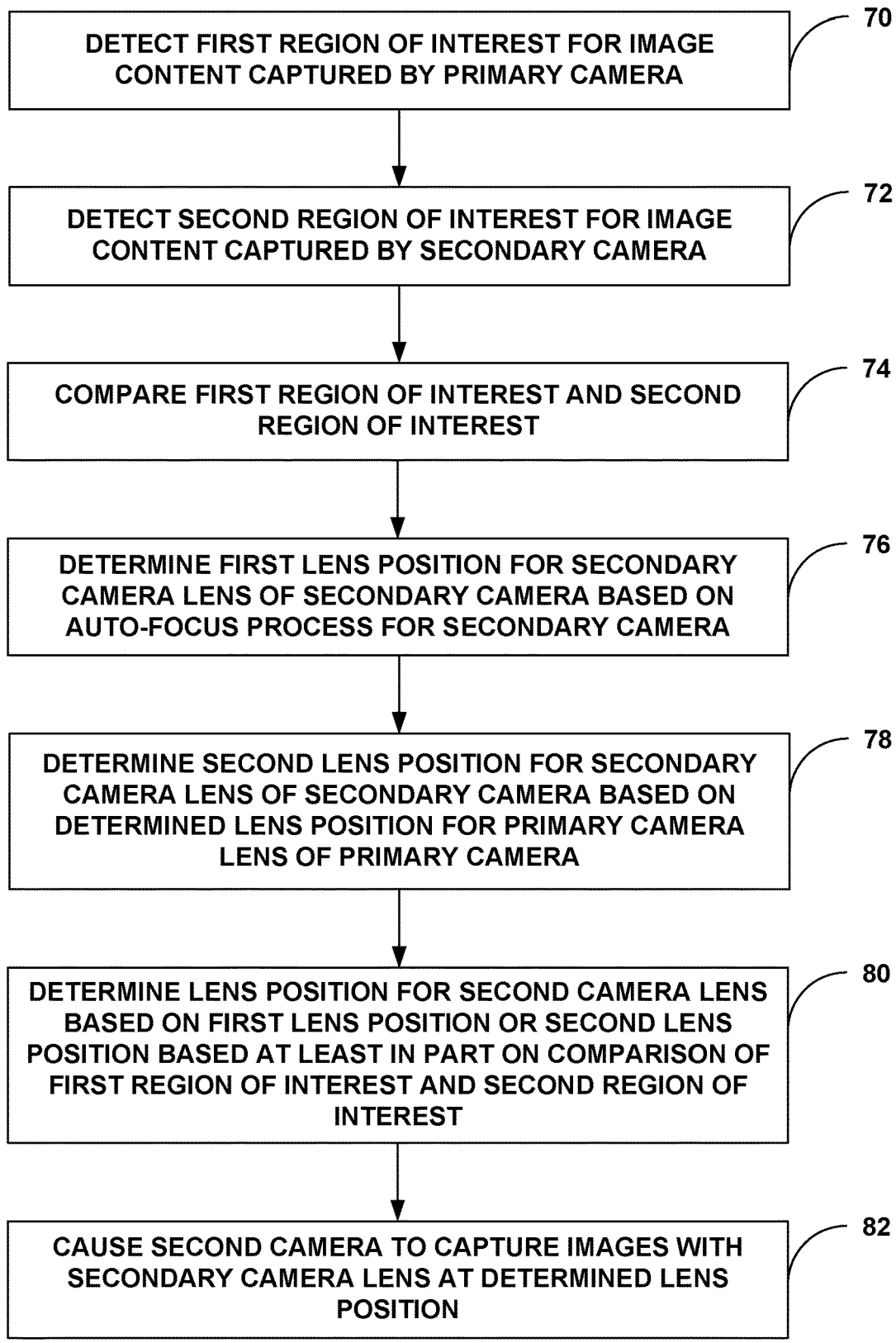
FIG. 5 is a flowchart illustrating another example operation of camera processing in accordance with example techniques of this disclosure.

FIG. 5 is a flowchart illustrating another example operation of camera processing in accordance with example techniques of this disclosure. For ease, the method for camera processing example of FIG. 5 is described with respect to one or more processors in communication with memory configured to receive images. Examples of the one or more processors include camera processor 14, CPU 16, GPU 18, processing circuitry of cameras 12A and 12B, display processor 26, or other processing circuitry of computing device 10. Examples of the memory include memory 30, local memory 20, or other memory for computing device 10.

The one or more processors may detect a first region of interest for image content captured with a primary camera 12A (70). For example, ROI detector 34A may detect the first region of interest for image content captured with primary camera 12A. The one or more processors may detect a second region of interest for image content captured with a secondary camera 12B (72). For example, ROI detector 34B may detect the second region of interest for image content captured with secondary camera 12B.

The one or more processors may compare the first region of interest and the second region of interest (74). For example, AF unit 36B (e.g., via aggregate unit 46) may compare an object in the first region of interest and an object in the second region of interest (e.g., to determine if the objects are the same). As another example, AF unit 36B (e.g., via aggregate unit 46) may compare a location of the first region of interest and a location of the second region of interest (e.g., to determine if the locations are the same). In some examples, aggregate unit 46 may also determine whether the same number of objects are determined (e.g., only one face or a plurality of faces).

The one or more processors may determine a first lens position for a secondary camera lens 13B of the secondary camera 12B based on an autofocus process for the secondary camera 12B (76). For example, PDAF unit 42 may determine a lens position for a secondary camera lens 13B based on the PDAF autofocus process for secondary camera 12B, and determine a confidence value associated with PDAF (e.g., first confidence value). TOF unit 44 may determine a lens position for a secondary camera lens 13B based on the TOF autofocus process for secondary camera 12B, and determine a confidence value associated with TOF (e.g., second confidence value).

The one or more processors may determine a second lens position for the secondary camera lens 13B of the secondary camera 12B based on a determined lens position for a primary camera lens 13A of the primary camera 12A (78). For example, position mapping unit 40 may determine the second lens position based on the lens position for primary camera lens 13A as determined by AF unit 36A.

The one or more processors may determine a lens position for the secondary camera lens 13B based on the first lens position or the second lens position based at least in part on the comparison of the first region of interest and the second region of interest (80). For example, aggregate unit 46 may determine the lens position for the secondary camera lens 13B based on the first lens position based at least in part on the object in the first region of interest being the same as the object in the second region of interest. For instance, aggregate unit 46 may set the lens position for the secondary camera lens 13B equal to the first lens position.

However, aggregate unit 46 may determine the lens position for the secondary camera lens 13B based on the second lens position based at least in part on the comparison indicating that an object in the first region of interest is different than an object in the second region of interest. For instance, aggregate unit 46 may set the lens position for the secondary camera lens 13B equal to the second lens position.

In some examples, for determining the lens position for the secondary camera lens 13B, aggregate unit 46 may determine the lens position for the secondary camera lens 13B based on the first lens position based on the comparison and the confidence value (e.g., the confidence value associated with PDAF or TOF) being greater than a threshold value. For example, if the comparison indicates that the first region of interest and the second region of interest are the same (e.g., same object, same location, etc.), then aggregate unit 46 may determine whether the confidence value is greater than a threshold value. If the confidence value is greater than the threshold value, then aggregate unit 46 may determine the lens position for the secondary camera lens 13B based on the first lens position (e.g., lens position for secondary camera lens 13B equals first lens position). If the confidence value is less than or equal to the threshold value, then aggregate unit 46 may determine the lens position for the secondary camera lens 13B based on the second lens position (e.g., lens position for secondary camera lens 13B equals second lens position).

In some examples, for determining the lens position for the secondary camera lens 13B, aggregate unit 46 may determine the lens position for the secondary camera lens based on the first lens position based on the comparison, the first confidence value (e.g., confidence value associated with PDAF) being less than a first threshold value, and the second confidence value (e.g., confidence value associated with TOF) being greater than a second threshold value. For example, if the comparison indicates that the first region of interest and the second region of interest are the same (e.g., same object, same location, etc.), then aggregate unit 46 may determine whether the first confidence value is greater than a first threshold value.

If the first confidence value is less than or equal to the first threshold value, then aggregate unit 46 may determine whether the second confidence value is greater than a second threshold value. If the second confidence value is greater than the second threshold value, then aggregate unit 46 may determine the lens position for the secondary camera lens 13B based on the first lens position (e.g., lens position for secondary camera lens 13B equals first lens position). If the second confidence value is less than or equal to the second threshold value, then aggregate unit 46 may determine the lens position for the secondary camera lens 13B based on the second lens position (e.g., lens position for secondary camera lens 13B equals second lens position).

The one or more processors may cause the secondary camera 12B to capture images with the secondary camera lens 13B at the determined lens position (82). For example, the one or more processors may cause primary camera 12A to capture images with the primary camera lens 13A at its determined lens position. The one or more processors may perform image processing to generate image content for display. As one example, the one or more processors may generate a final image having a bokeh effect based on a first image captured with the primary camera and a second image captured with the secondary camera.

The following describe one or more example techniques described in this disclosure. The example techniques may be used together or separately.

Clause 1: A device configured for camera processing includes a memory configured to receive images; and one or more processors in communication with the memory, the one or more processors configured to: detect a first region of interest for image content captured with a primary camera; detect a second region of interest for image content captured with a secondary camera; compare the first region of interest and the second region of interest; determine a first lens position for a secondary camera lens of the secondary camera based on an autofocus process for the secondary camera; determine a second lens position for the secondary camera lens of the secondary camera based on a determined lens position for a primary camera lens of the primary camera; determine a lens position for the secondary camera lens based on the first lens position or the second lens position based at least in part on the comparison of the first region of interest and the second region of interest; and cause the secondary camera to capture images with the secondary camera lens at the determined lens position.

Clause 2: The device of clause 1, wherein the one or more processors are configured to generate a final image having a bokeh effect based on a first image captured with the primary camera and a second image captured with the secondary camera.

Clause 3: The device of any of clauses 1 and 2, wherein comparing the first region of interest and the second region of interest comprises comparing an object in the first region of interest and an object in the second region of interest, and wherein determining the lens position comprises determining the lens position for the secondary camera lens based on the first lens position based at least in part on the object in the first region of interest being the same as the object in the second region of interest.

Clause 4: The device of any of clauses 1 through 3, wherein comparing the first region of interest and the second region of interest comprises comparing a location of the first region of interest and a location of the second region of interest, and wherein determining the lens position comprises determining the lens position for the secondary camera lens based on the first lens position based at least in part on the location of the first region of interest being the same as the location of the second region of interest.

Clause 5: The device of any of clauses 1 through 4, wherein the one or more processors are configured to: determine a confidence value associated with a depth estimation algorithm for the secondary camera, wherein determining the lens position for the secondary camera lens comprises determining the lens position for the secondary camera lens based on the first lens position based on the comparison and the confidence value being greater than a threshold value.

Clause 6: The device of clause 5, wherein the depth estimation algorithm is one of a phase detection autofocus (PDAF) algorithm or a time of flight (TOF) algorithm.

Clause 7: The device of any of clauses 1 through 6, wherein the one or more processors are configured to: determine a first confidence value associated with a first depth estimation algorithm for the secondary camera and a second confidence value associated with a second depth estimation algorithm for the secondary camera, wherein determining the lens position for the secondary camera lens comprises determining the lens position for the secondary camera lens based on the first lens position based on the comparison, the first confidence value being less than a first threshold value, and the second confidence value being greater than a second threshold value.

Clause 8: The device of clause 7, wherein the first depth estimation algorithm is a phase detection autofocus (PDAF) algorithm, and the second depth estimation algorithm is a time of flight (TOF) algorithm.

Clause 9: The device of any of clauses 1 through 8, wherein determining the lens position for the secondary camera lens comprises determining the lens position for the secondary camera lens based on the second lens position based on the comparison indicating that an object in the first region of interest being different than an object in the second region of interest.

Clause 10: The device of any of clauses 1 through 9, wherein the device comprises the primary camera and the secondary camera.

Clause 11: A method for camera processing includes detecting a first region of interest for image content captured with a primary camera; detecting a second region of interest for image content captured with a secondary camera; comparing the first region of interest and the second region of interest; determining a first lens position for a secondary camera lens of the secondary camera based on an autofocus process for the secondary camera; determining a second lens position for the secondary camera lens of the secondary camera based on a determined lens position for a primary camera lens of the primary camera; determining a lens position for the secondary camera lens based on the first lens position or the second lens position based at least in part on the comparison of the first region of interest and the second region of interest; and causing the secondary camera to capture images with the secondary camera lens at the determined lens position.

Clause 12: The method of clause 11, further includes generating a final image having a bokeh effect based on a first image captured with the primary camera and a second image captured with the secondary camera.

Clause 13: The method of any of clauses 11 and 12, wherein comparing the first region of interest and the second region of interest comprises comparing an object in the first region of interest and an object in the second region of interest, and wherein determining the lens position comprises determining the lens position for the secondary camera lens based on the first lens position based at least in part on the object in the first region of interest being the same as the object in the second region of interest.

Clause 14: The method of any of clauses 11 through 13, wherein comparing the first region of interest and the second region of interest comprises comparing a location of the first region of interest and a location of the second region of interest, and wherein determining the lens position comprises determining the lens position for the secondary camera lens based on the first lens position based at least in part on the location of the first region of interest being the same as the location of the second region of interest.

Clause 15: The method of any of clauses 11 through 14, further includes determining a confidence value associated with a depth estimation algorithm for the secondary camera, wherein determining the lens position for the secondary camera lens comprises determining the lens position for the secondary camera lens based on the first lens position based on the comparison and the confidence value being greater than a threshold value.

Clause 16: The method of clause 15, wherein the depth estimation algorithm is one of a phase detection autofocus (PDAF) algorithm or a time of flight (TOF) algorithm.

Clause 17: The method of any of clauses 11 through 16, further includes determining a first confidence value associated with a first depth estimation algorithm for the secondary camera and a second confidence value associated with a second depth estimation algorithm for the secondary camera, wherein determining the lens position for the secondary camera lens comprises determining the lens position for the secondary camera lens based on the first lens position based on the comparison, the first confidence value being less than a first threshold value, and the second confidence value being greater than a second threshold value.

Clause 18: The method of clause 17, wherein the first depth estimation algorithm is a phase detection autofocus (PDAF) algorithm, and the second depth estimation algorithm is a time of flight (TOF) algorithm.

Clause 19: The method of any of clauses 11 through 18, wherein determining the lens position for the secondary camera lens comprises determining the lens position for the secondary camera lens based on the second lens position based on the comparison indicating that an object in the first region of interest being different than an object in the second region of interest.

Clause 20: A computer-readable storage medium storing instructions thereon that when executed cause one or more processors to: detect a first region of interest for image content captured with a primary camera; detect a second region of interest for image content captured with a secondary camera; compare the first region of interest and the second region of interest; determine a first lens position for a secondary camera lens of the secondary camera based on an autofocus process for the secondary camera; determine a second lens position for the secondary camera lens of the secondary camera based on a determined lens position for a primary camera lens of the primary camera; determine a lens position for the secondary camera lens based on the first lens position or the second lens position based at least in part on the comparison of the first region of interest and the second region of interest; and cause the secondary camera to capture images with the secondary camera lens at the determined lens position.

Clause 21: The computer-readable storage medium of clause 20, further includes generate a final image having a bokeh effect based on a first image captured with the primary camera and a second image captured with the secondary camera.

Clause 22: The computer-readable storage medium of any of clauses 20 and 21, wherein the instructions that cause the one or more processors to compare the first region of interest and the second region of interest comprise instructions that cause the one or more processors to compare an object in the first region of interest and an object in the second region of interest, and wherein the instructions that cause the one or more processors to determine the lens position comprise instructions that cause the one or more processors to determine the lens position for the secondary camera lens based on the first lens position based at least in part on the object in the first region of interest being the same as the object in the second region of interest.

Clause 23: The computer-readable storage medium of any of clauses 20 through 22, wherein the instructions that cause the one or more processors to compare the first region of interest and the second region of interest comprise instructions that cause the one or more processors to compare a location of the first region of interest and a location of the second region of interest, and wherein the instructions that cause the one or more processors to determine the lens position comprise instructions that cause the one or more processors to determine the lens position for the secondary camera lens based on the first lens position based at least in part on the location of the first region of interest being the same as the location of the second region of interest.

Clause 24: The computer-readable storage medium of any of clauses 20 through 23, further includes determine a confidence value associated with a depth estimation algorithm for the secondary camera, wherein the instructions that cause the one or more processors to determine the lens position for the secondary camera lens comprise instructions that cause the one or more processors to determine the lens position for the secondary camera lens based on the first lens position based on the comparison and the confidence value being greater than a threshold value.

Clause 25: The computer-readable storage medium of any of clauses 20 through 24, further includes determine a first confidence value associated with a first depth estimation algorithm for the secondary camera and a second confidence value associated with a second depth estimation algorithm for the secondary camera, wherein the instructions that cause the one or more processors to determine the lens position for the secondary camera lens comprise instructions that cause the one or more processors to determine the lens position for the secondary camera lens based on the first lens position based on the comparison, the first confidence value being less than a first threshold value, and the second confidence value being greater than a second threshold value.

Clause 26: A device for camera processing includes means for detecting a first region of interest for image content captured with a primary camera; means for detecting a second region of interest for image content captured with a secondary camera; means for comparing the first region of interest and the second region of interest; means for determining a first lens position for a secondary camera lens of the secondary camera based on an autofocus process for the secondary camera; means for determining a second lens position for the secondary camera lens of the secondary camera based on a determined lens position for a primary camera lens of the primary camera; means for determining a lens position for the secondary camera lens based on the first lens position or the second lens position based at least in part on the comparison of the first region of interest and the second region of interest; and means for causing the secondary camera to capture images with the secondary camera lens at the determined lens position.

Clause 27: The device of clause 26, further includes means for generating a final image having a bokeh effect based on a first image captured with the primary camera and a second image captured with the secondary camera.

Clause 28: The device of any of clauses 26 and 27, wherein the means for comparing the first region of interest and the second region of interest comprises means for comparing an object in the first region of interest and an object in the second region of interest, and wherein the means for determining the lens position comprises means for determining the lens position for the secondary camera lens based on the first lens position based at least in part on the object in the first region of interest being the same as the object in the second region of interest.

Clause 29: The device of any of clauses 26 through 28, wherein the means for comparing the first region of interest and the second region of interest comprises means for comparing a location of the first region of interest and a location of the second region of interest, and wherein the means for determining the lens position comprises means for determining the lens position for the secondary camera lens based on the first lens position based at least in part on the location of the first region of interest being the same as the location of the second region of interest.

Clause 30: The device of any of clauses 26 through 29, further includes means for determining a confidence value associated with a depth estimation algorithm for the secondary camera, wherein the means for determining the lens position for the secondary camera lens comprises means for determining the lens position for the secondary camera lens based on the first lens position based on the comparison and the confidence value being greater than a threshold value.

In one or more examples, the functions described may be implemented in hardware, software, firmware, or any combination thereof. If implemented in software, the functions may be stored on or transmitted over, as one or more instructions or code, a computer-readable medium and executed by a hardware-based processing unit. Computer-readable media may include computer-readable storage media, which corresponds to a tangible medium such as data storage media. In this manner, computer-readable media generally may correspond to tangible computer-readable storage media which is non-transitory. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, cache memory, or any other medium that can be used to store desired program code in the form of instructions or data structures and that can be accessed by a computer. It should be understood that computer-readable storage media and data storage media do not include carrier waves, signals, or other transient media, but are instead directed to non-transient, tangible storage media. Disk and disc, as used herein, includes compact disc (CD), laser disc, optical disc, digital versatile disc (DVD), floppy disk and Blu-ray disc, where discs usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units.

Various examples have been described. These and other examples are within the scope of the following claims.

What is claimed is:

1. A device configured for camera processing, the device comprising:
 a memory configured to receive images; and
 one or more processors in communication with the memory, the one or more processors configured to:
  detect a first region of interest for image content captured with a primary camera;
  detect a second region of interest for image content captured with a secondary camera;

compare the first region of interest and the second region of interest;
determine a first lens position for a secondary camera lens of the secondary camera based on an autofocus process for the secondary camera;
determine a second lens position for the secondary camera lens of the secondary camera based on a determined lens position for a primary camera lens of the primary camera;
determine a lens position for the secondary camera lens based on the first lens position or the second lens position based at least in part on the comparison of the first region of interest and the second region of interest; and
cause the secondary camera to capture images with the secondary camera lens at the determined lens position.

2. The device of claim 1, wherein the one or more processors are configured to generate a final image having a bokeh effect based on a first image captured with the primary camera and a second image captured with the secondary camera.

3. The device of claim 1, wherein comparing the first region of interest and the second region of interest comprises comparing an object in the first region of interest and an object in the second region of interest, and wherein determining the lens position comprises determining the lens position for the secondary camera lens based on the first lens position based at least in part on the object in the first region of interest being the same as the object in the second region of interest.

4. The device of claim 1, wherein comparing the first region of interest and the second region of interest comprises comparing a location of the first region of interest and a location of the second region of interest, and wherein determining the lens position comprises determining the lens position for the secondary camera lens based on the first lens position based at least in part on the location of the first region of interest being the same as the location of the second region of interest.

5. The device of claim 1, wherein the one or more processors are configured to:
determine a confidence value associated with a depth estimation algorithm for the secondary camera,
wherein determining the lens position for the secondary camera lens comprises determining the lens position for the secondary camera lens based on the first lens position based on the comparison and the confidence value being greater than a threshold value.

6. The device of claim 5, wherein the depth estimation algorithm is one of a phase detection autofocus (PDAF) algorithm or a time of flight (TOF) algorithm.

7. The device of claim 1, wherein the one or more processors are configured to:
determine a first confidence value associated with a first depth estimation algorithm for the secondary camera and a second confidence value associated with a second depth estimation algorithm for the secondary camera,
wherein determining the lens position for the secondary camera lens comprises determining the lens position for the secondary camera lens based on the first lens position based on the comparison, the first confidence value being less than a first threshold value, and the second confidence value being greater than a second threshold value.

8. The device of claim 7, wherein the first depth estimation algorithm is a phase detection autofocus (PDAF) algorithm, and the second depth estimation algorithm is a time of flight (TOF) algorithm.

9. The device of claim 1, wherein determining the lens position for the secondary camera lens comprises determining the lens position for the secondary camera lens based on the second lens position based on the comparison indicating that an object in the first region of interest being different than an object in the second region of interest.

10. The device of claim 1, wherein the device comprises the primary camera and the secondary camera.

11. A method for camera processing, the method comprising:
detecting a first region of interest for image content captured with a primary camera;
detecting a second region of interest for image content captured with a secondary camera;
comparing the first region of interest and the second region of interest;
determining a first lens position for a secondary camera lens of the secondary camera based on an autofocus process for the secondary camera;
determining a second lens position for the secondary camera lens of the secondary camera based on a determined lens position for a primary camera lens of the primary camera;
determining a lens position for the secondary camera lens based on the first lens position or the second lens position based at least in part on the comparison of the first region of interest and the second region of interest; and
causing the secondary camera to capture images with the secondary camera lens at the determined lens position.

12. The method of claim 11, further comprising:
generating a final image having a bokeh effect based on a first image captured with the primary camera and a second image captured with the secondary camera.

13. The method of claim 11, wherein comparing the first region of interest and the second region of interest comprises comparing an object in the first region of interest and an object in the second region of interest, and wherein determining the lens position comprises determining the lens position for the secondary camera lens based on the first lens position based at least in part on the object in the first region of interest being the same as the object in the second region of interest.

14. The method of claim 11, wherein comparing the first region of interest and the second region of interest comprises comparing a location of the first region of interest and a location of the second region of interest, and wherein determining the lens position comprises determining the lens position for the secondary camera lens based on the first lens position based at least in part on the location of the first region of interest being the same as the location of the second region of interest.

15. The method of claim 11, further comprising:
determining a confidence value associated with a depth estimation algorithm for the secondary camera,
wherein determining the lens position for the secondary camera lens comprises determining the lens position for the secondary camera lens based on the first lens position based on the comparison and the confidence value being greater than a threshold value.

16. The method of claim 15, wherein the depth estimation algorithm is one of a phase detection autofocus (PDAF) algorithm or a time of flight (TOF) algorithm.

17. The method of claim 11, further comprising:
determining a first confidence value associated with a first depth estimation algorithm for the secondary camera and a second confidence value associated with a second depth estimation algorithm for the secondary camera,
wherein determining the lens position for the secondary camera lens comprises determining the lens position for the secondary camera lens based on the first lens position based on the comparison, the first confidence value being less than a first threshold value, and the second confidence value being greater than a second threshold value.

18. The method of claim 17, wherein the first depth estimation algorithm is a phase detection autofocus (PDAF) algorithm, and the second depth estimation algorithm is a time of flight (TOF) algorithm.

19. The method of claim 11, wherein determining the lens position for the secondary camera lens comprises determining the lens position for the secondary camera lens based on the second lens position based on the comparison indicating that an object in the first region of interest being different than an object in the second region of interest.

20. A computer-readable storage medium storing instructions thereon that when executed cause one or more processors to:
detect a first region of interest for image content captured with a primary camera;
detect a second region of interest for image content captured with a secondary camera;
compare the first region of interest and the second region of interest;
determine a first lens position for a secondary camera lens of the secondary camera based on an autofocus process for the secondary camera;
determine a second lens position for the secondary camera lens of the secondary camera based on a determined lens position for a primary camera lens of the primary camera;
determine a lens position for the secondary camera lens based on the first lens position or the second lens position based at least in part on the comparison of the first region of interest and the second region of interest; and
cause the secondary camera to capture images with the secondary camera lens at the determined lens position.

21. The computer-readable storage medium of claim 20, further comprising instructions that cause the one or more processors to:
generate a final image having a bokeh effect based on a first image captured with the primary camera and a second image captured with the secondary camera.

22. The computer-readable storage medium of claim 20, wherein the instructions that cause the one or more processors to compare the first region of interest and the second region of interest comprise instructions that cause the one or more processors to compare an object in the first region of interest and an object in the second region of interest, and wherein the instructions that cause the one or more processors to determine the lens position comprise instructions that cause the one or more processors to determine the lens position for the secondary camera lens based on the first lens position based at least in part on the object in the first region of interest being the same as the object in the second region of interest.

23. The computer-readable storage medium of claim 20, wherein the instructions that cause the one or more processors to compare the first region of interest and the second region of interest comprise instructions that cause the one or more processors to compare a location of the first region of interest and a location of the second region of interest, and wherein the instructions that cause the one or more processors to determine the lens position comprise instructions that cause the one or more processors to determine the lens position for the secondary camera lens based on the first lens position based at least in part on the location of the first region of interest being the same as the location of the second region of interest.

24. The computer-readable storage medium of claim 20, further comprising instructions that cause the one or more processors to:
determine a confidence value associated with a depth estimation algorithm for the secondary camera,
wherein the instructions that cause the one or more processors to determine the lens position for the secondary camera lens comprise instructions that cause the one or more processors to determine the lens position for the secondary camera lens based on the first lens position based on the comparison and the confidence value being greater than a threshold value.

25. The computer-readable storage medium of claim 20, further comprising instructions that cause the one or more processors to:
determine a first confidence value associated with a first depth estimation algorithm for the secondary camera and a second confidence value associated with a second depth estimation algorithm for the secondary camera,
wherein the instructions that cause the one or more processors to determine the lens position for the secondary camera lens comprise instructions that cause the one or more processors to determine the lens position for the secondary camera lens based on the first lens position based on the comparison, the first confidence value being less than a first threshold value, and the second confidence value being greater than a second threshold value.

26. A device for camera processing, the device comprising:
means for detecting a first region of interest for image content captured with a primary camera;
means for detecting a second region of interest for image content captured with a secondary camera;
means for comparing the first region of interest and the second region of interest;
means for determining a first lens position for a secondary camera lens of the secondary camera based on an autofocus process for the secondary camera;
means for determining a second lens position for the secondary camera lens of the secondary camera based on a determined lens position for a primary camera lens of the primary camera;
means for determining a lens position for the secondary camera lens based on the first lens position or the second lens position based at least in part on the comparison of the first region of interest and the second region of interest; and
means for causing the secondary camera to capture images with the secondary camera lens at the determined lens position.

27. The device of claim 26, further comprising:
means for generating a final image having a bokeh effect based on a first image captured with the primary camera and a second image captured with the secondary camera.

28. The device of claim 26, wherein the means for comparing the first region of interest and the second region of interest comprises means for comparing an object in the first region of interest and an object in the second region of interest, and wherein the means for determining the lens position comprises means for determining the lens position for the secondary camera lens based on the first lens position based at least in part on the object in the first region of interest being the same as the object in the second region of interest.

29. The device of claim 26, wherein the means for comparing the first region of interest and the second region of interest comprises means for comparing a location of the first region of interest and a location of the second region of interest, and wherein the means for determining the lens position comprises means for determining the lens position for the secondary camera lens based on the first lens position based at least in part on the location of the first region of interest being the same as the location of the second region of interest.

30. The device of claim 26, further comprising:
means for determining a confidence value associated with a depth estimation algorithm for the secondary camera, wherein the means for determining the lens position for the secondary camera lens comprises means for determining the lens position for the secondary camera lens based on the first lens position based on the comparison and the confidence value being greater than a threshold value.

* * * * *